United States Patent [19]
Sioli

[11] Patent Number: 4,758,322
[45] Date of Patent: Jul. 19, 1988

[54] APPARATUS FOR THE ELECTROLYSIS OF SOLUTIONS
[75] Inventor: Giancarlo Sioli, Cernobbio, Italy
[73] Assignee: Metkon S.A., Switzerland
[21] Appl. No.: 886,089
[22] Filed: Jul. 16, 1986
[30] Foreign Application Priority Data
   Jul. 17, 1985 [CH] Switzerland .................. 03093/85
[51] Int. Cl.⁴ .................. C25B 13/02; C25B 11/03; C25C 7/04; C25C 7/02
[52] U.S. Cl. .................. 204/255; 204/253; 204/254; 204/268; 204/269; 204/283
[58] Field of Search ............ 204/270, 282, 283, 284, 204/279, 254, 255, 256, 268, 269

[56] References Cited
U.S. PATENT DOCUMENTS

| | | | |
|---|---|---|---|
| 1,094,728 | 4/1914 | Levin | 204/256 |
| 1,153,168 | 9/1915 | Levin | 204/256 |
| 2,717,872 | 9/1955 | Zdansky | 204/256 |
| 3,287,251 | 11/1966 | Horn et al. | 204/270 |
| 3,941,675 | 2/1976 | Strasser et al. | 204/256 |
| 4,073,715 | 2/1978 | DeNora et al. | 204/256 |
| 4,197,178 | 4/1980 | Pellegri et al. | 204/255 |
| 4,265,719 | 5/1981 | Ezzell et al. | 204/283 X |
| 4,339,324 | 7/1982 | Haas | 204/270 |
| 4,389,289 | 6/1983 | DeNora | 204/255 X |

FOREIGN PATENT DOCUMENTS

| | | | |
|---|---|---|---|
| 219622 | 7/1961 | Austria | 204/256 |
| 514391 | 12/1930 | Fed. Rep. of Germany | 204/256 |
| 679334 | 9/1952 | United Kingdom | 204/254 |
| 1244397 | 9/1971 | United Kingdom | 204/270 |

Primary Examiner—John F. Niebling
Assistant Examiner—John S. Starsiak, Jr.
Attorney, Agent, or Firm—Ostrolenk, Faber, Gerb & Soffen

[57] ABSTRACT

Apparatus for the electrolysis of solutions. The apparatus comprises bipolar elements formed of a conductive plate peripherally surrounded by an insulating frame provided with feeding and discharging channels along peripheral zones of the frame. A cavity is formed with the conductive plate as the bottom and the frame as wall. Separating elements can be inserted between the bipolar elements. The separating elements consist of a porous diaphragm and an insulating frame also having feeding and discharging channels. Electrodic structures, consisting of cut and expanded metal sheets, nets or other material having high internal porosity may fill up the remaining space between two lateral bipolar elements and a central separating element.

8 Claims, 7 Drawing Sheets

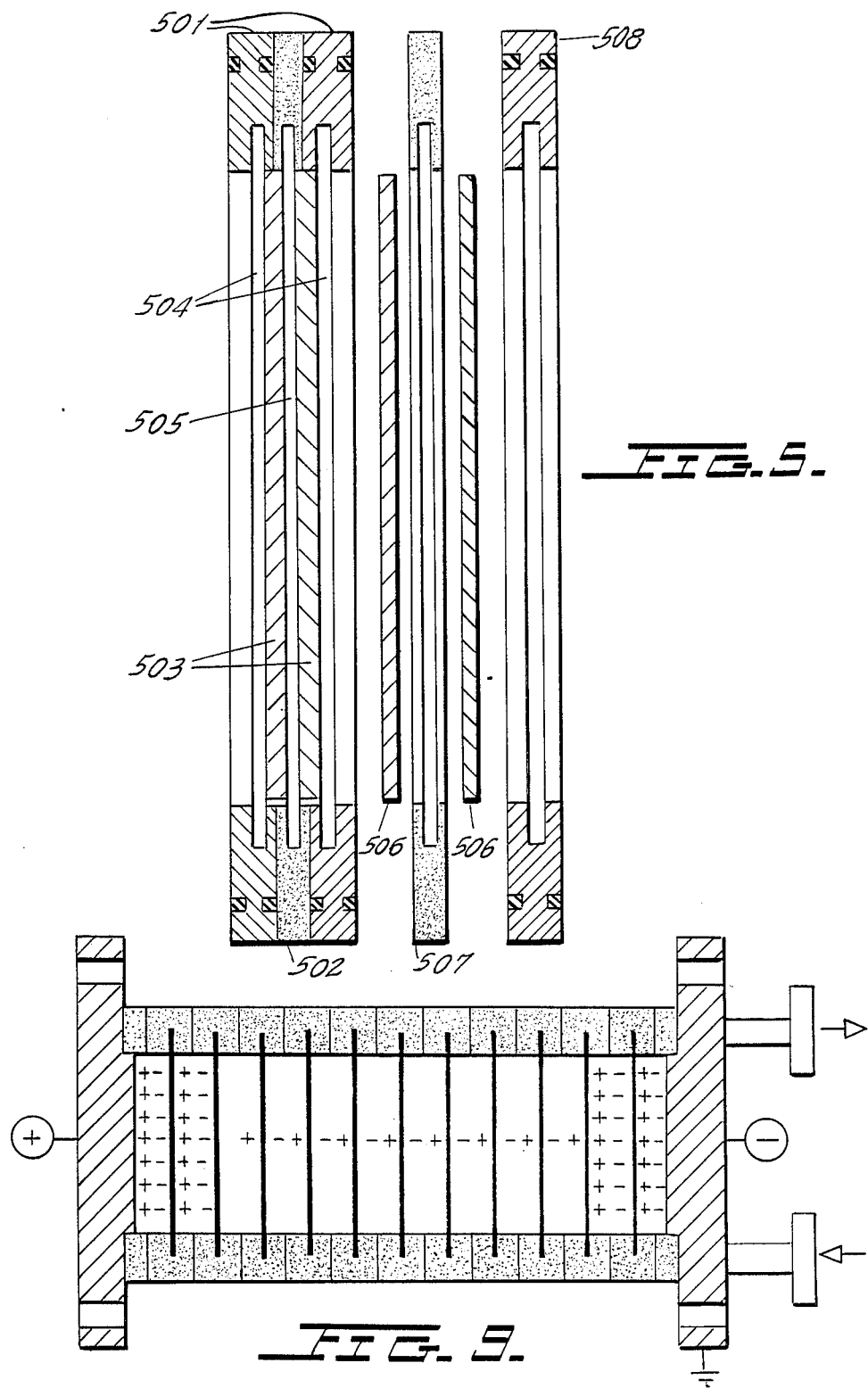

$$AL = \frac{L_2 - L_1}{L_1} 100$$

APPARATUS FOR THE ELECTROLYSIS OF SOLUTIONS

BACKGROUND OF THE INVENTION

1. Field of the Invention

The invention relates to electrolytic reactors. More specifically, the invention relates to an electrolytic reactor containing a series of bipolar element cells that optionally contain separation and additional electrode elements.

2. Description of the Related Art

A conventional electrolysis cell C is represented in the cross section sketch of FIG. 1A. The cell is essentially made up of two metal electrodes 101 and 102, of generally extended surface, submerged in a conductive fluid (electrolyte) 103. The fluid is polarized in such a way as to maintain a constant electric field between the electrodes. Due to the electric field, each ion in the electrolyte migrates towards the electrode polarized with an opposite sign, interacting with the surface of said electrode, and thereby giving rise to an electrochemical transformation of matter. The system is contained in a vessel 104 and sometimes includes a separator 105 to collect the gaseous products produced by the chemical process along the electrodic surface. The separator 105 must be permeable to the electric charge carriers within the electrolyte.

The amount of matter converted in the unit time depends upon the D.C. flow between the electrodes and the electrode surface area. When an increase of such amount is desired and a further increase of the electrodes surface is impracticable, it is customary to assemble a certain number of cells in series or in parallel. The series configuration gives rise to the well-known bipolar electrolyzers, corresponding to the sketch shown in FIG. 1B. In these apparatus cells $C_0, C_1, \ldots C_i, \ldots C_n$ are separated from each other by conductive elements $E_1, E_2, \ldots E_i, \ldots E_n$ carrying opposite polarity on the two opposite faces, i.e. $F_1, F_2$, in contact with two consecutive cells. These elements are bipolar plates. FIG. 1B separators $S_i$ for the electrodic compartments. Electrolyzers corresponding to this general type are used in industrial processes, such as caustic-chlorine production and water electrolysis.

The quantity of electric work spent in order to carry out the electrochemical process is higher than the amount thermodynamically necessary. This is due to energy losses in non-reversible phenomena. Some of these are: the electrical current dispersion along the electrolyte feeding and discharge piping which is also a source of localized corrosion of the electrolysis equipment; the voltage drop across the electrolyte and the separator; the presence of gas bubbles between the electrodes; and, the ohmic drops due to the current flow throughout the structure of the cells. Other losses are independent of the cell geometry. These depend on the nature of the electrodic surfaces in relation to the specific electrochemical process. Their amount is measured by the so-called electrode overvoltage. An important factor in their reduction is the opportunity the electrolysis cells have to operate at relatively high temperature. Presently, commercial cells are limited in their operating temperature by the presence of parts made of materials which are not able to resist high temperatures. Operation at high temperature is often conducted at superatmospheric pressure to prevent the liquid electrolysis from boiling, or at least restrict its evaporation. Commercial cells offer only limited possibilities to operate under pressure.

The current losses throughout the liquid connections with the external circuits are reduced by minimizing the cross section of the liquids' distribution ducts. This requires an increase of pressure drop not applicable to all the electrolysis equipment where the electrolyte circulation is effected by thermosiphon procedures. The reduction of the gas ducts' cross section requires in turn the reduction of the specific volume of the gaseous phase. This means operating under pressure, with the above-mentioned limitations.

The energy losses due to the D.C. field crossing the electrolyte flow can be lowered by shortening, as far as possible, the mutual distance between the electrodes. Almost all commercial electrolyzers have electrodes at a distance from a few millimeters up to some centimeters from each other. The reciprocal location of the electrodes gives problems for their parallelism which are difficult to solve, particularly if the electrodic surface is large. Lack of parallelism causes higher current flows where the distances are short, with local increases in current density and consequent extra losses of energy due to the excessive overvoltage and ohmic drop. Moving the electrodes closer to the separator tends to trap the gases evolved by the electrochemical reaction between the electrodes and the separator, thereby interrupting the electrical current flow.

The general lack of design simplicity must be added to all the above-mentioned limitations of commercial electrolyzers. This means higher costs, difficult access to the various parts, assembling and disassembling, replacement of worn out elements such as separators or the electrodes to be catalytically regenerated, and peripheral gas- and liquid-tight cells for atmospheric pressure operation.

Finally, limited usable current density necessitates large electrodic surfaces, with resulting high costs and large horizontal and vertical size of the electrolysis equipment.

SUMMARY OF THE INVENTION

The first aim of this invention is to provide electrolytic cells without the above drawbacks and which are useful in many electrochemical industrial processes. The cells have the fundamental characteristics of: design simplicity, high energy efficiency, minimal current losses throughout the liquid connections, performance at high current density, possibility of pressure operation, use of relatively high temperature with respect to the usual levels of the non-metallurgical processes, extreme compactness, possibility to be assembled in different configurations depending on the specific electrochemical process to be performed, possibility of accepting separators of different nature as conventional diaphragms including ionically active membranes or even systems carrying a solid polymeric electrolyte, use of a wide range of construction materials and consequent acceptance of either alkaline or acid electrolytes at various concentrations, and limitation of the opportunity of the parts under high voltage of coming in contact with the operator.

A further object of this invention is the assembly of ·cells in the various possible configurations in order to make up electrolyzers.

A further object of this invention is to obtain the most efficient use of the cells and of the electrolysis.

BRIEF DESCRIPTION OF THE DRAWINGS

FIGS. 4, 4A, 5 and 9 are section views of electrolyzers.

DETAILED DESCRIPTION OF THE PREFERRED EMBODIMENTS

The components of the electrolysis cells according to the invention comprise bipolar elements, separating elements and electrodic structures.

A typical bipolar element EB is shown in FIGS. 2, 2A, 2B, and 2C. It consists of a plate or membrane 201 impervious to gas and liquids, made of electrically conductive material, surrounded by a frame 202 made of electrically insulating material. The frame is made of technopolymer or resinous material, molded or formed according to the usual techniques of injection or compression molding. The shape may be polygonal or elliptical, but preferably circular, thus allowing the cell to function in conditions of elevated internal fluid pressure.

Figure 2:
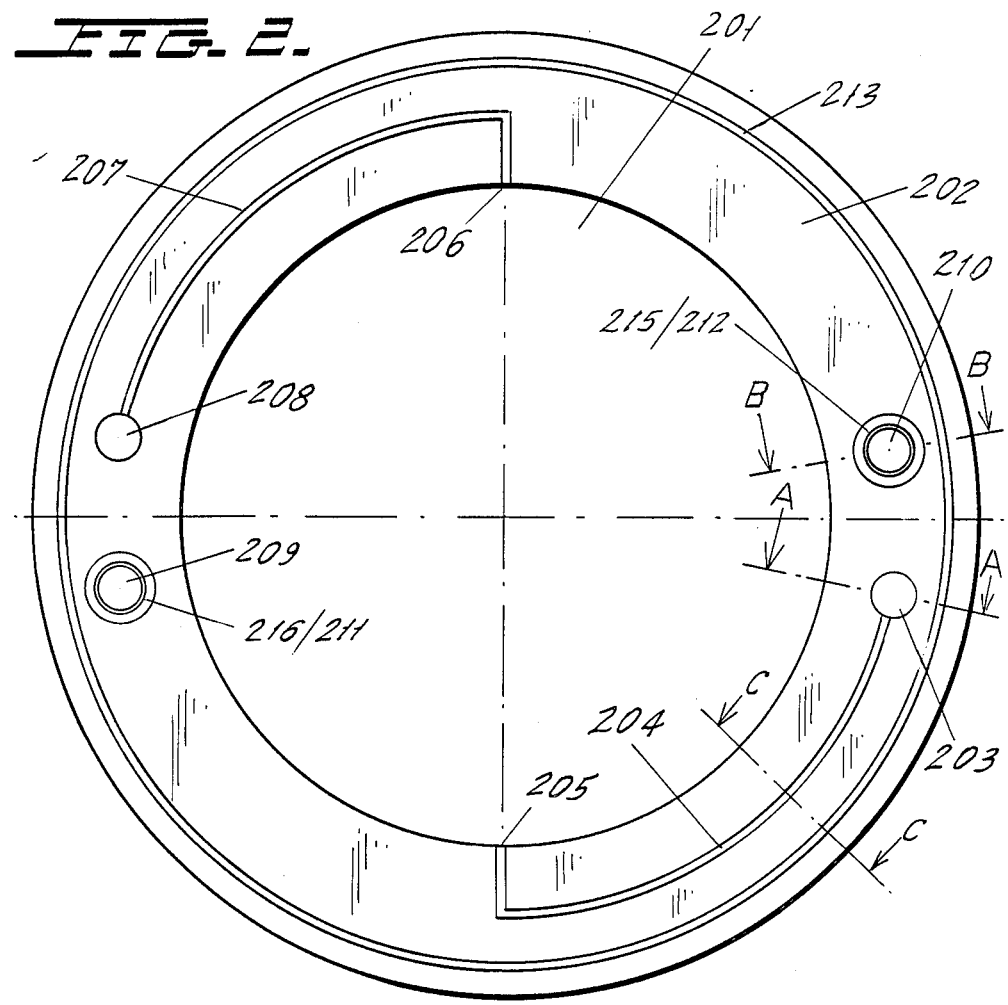
FIGS. 2, 2A, 2B, 2C and 3 are schematic and partial views of a bipolar element and of a separating element.
Figures 2A, 2B, 2C:
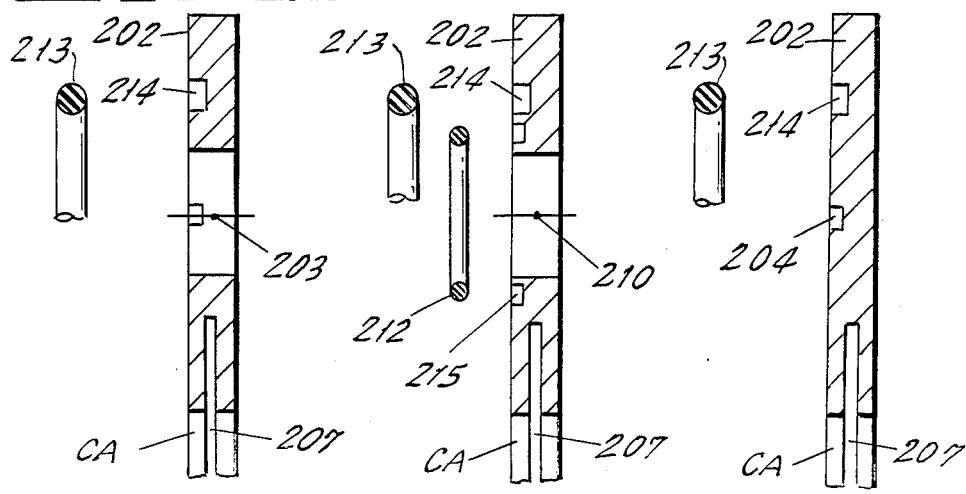

The hole 203 is part of the electrolyte feeding header and, as shown in FIG. 2A (section A—A of FIG. 2), it crosses the full thickness of the electrically insulating material constituting the frame 202, having for this reason its axis normal to the plate 201. The electrolyte flows in the feeding channel 204. Channel 204 extends in a circular fashion and is located in the surface of frame 202. The electrolyte enters through the port 205 into the cavity CA. The cavity has the plate 201 as bottom and the thickness of the frame 202 as a wall. The cavity CA is located, with respect to the plate itself, at the observer side. The electrolyte is distributed throughout all the available space.

The mixture of gases and liquids, comprising the product of the electrochemical reactions taking place in the cavity between the plate and frame, enters opening 206 of the discharging channel 207, which is preferably of the same nature as 204, in order to reach the discharge hole 208. The electrolyte inlet and the product outlet 206 from CA should be in diametrically opposite positions. The same is true of the inlet 203 and the exit 208 from the frame 202.

The holes 209 and 210, of the same nature as 203 and 208, are elements of the headers for the distribution of fluids and have no connection with the cell cavity CA. Their purpose will be explained later. These holes must not be contacted by the fluids contained in the cavity and are protected by gaskets 211 and 212.

Figure 3:
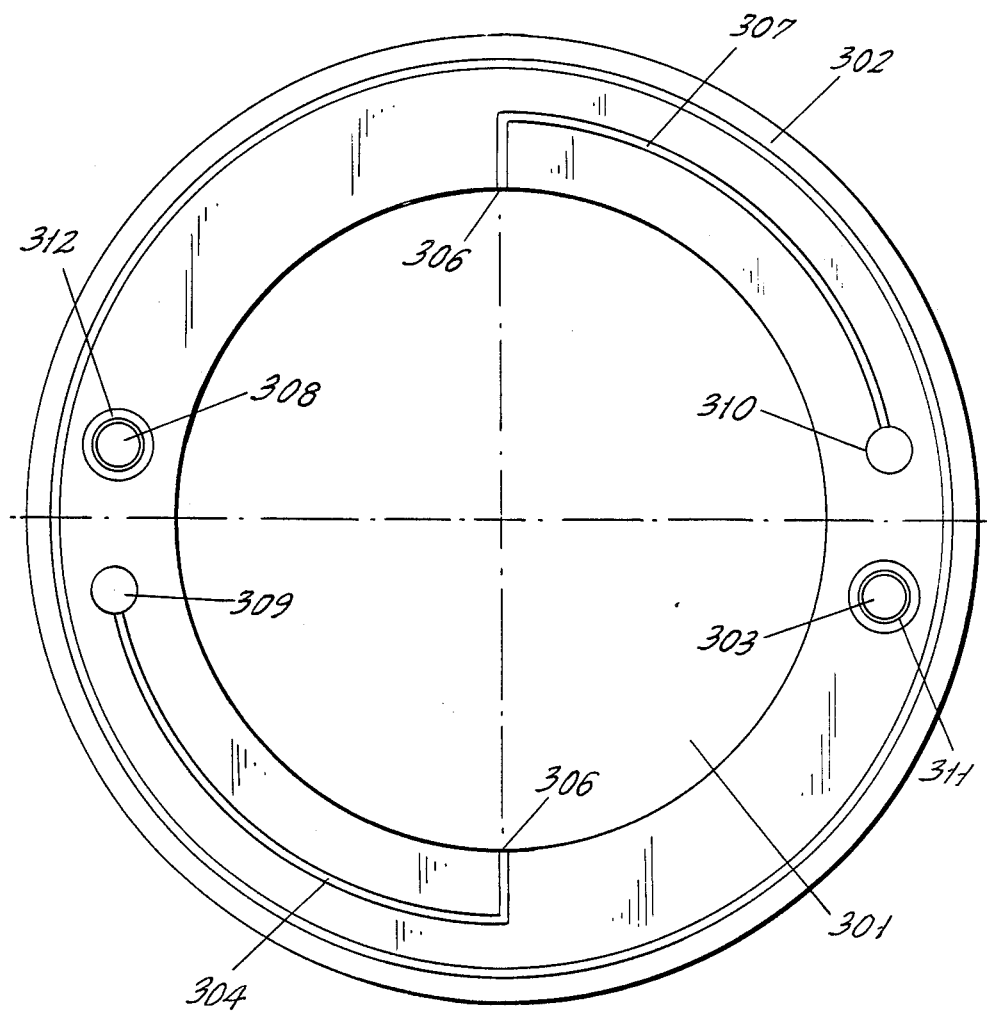

FIG. 3 (to be read in analogy to FIG. 2) shows a separating element, designed to separate the anodic compartment from the cathodic compartment of each cell, whenever this is necessary for a specific electrochemical process. The separator is a porous diaphragm 301, whose peripheral zone is incorporated in an electrically insulating frame 302. Like the bipolar element frame of FIG. 2, the frame of the separating element is also made of technopolymer or resinous materials, resistant to the contained fluids in the operating conditions of the electrolytic process.

The hole 309 is an element of the header for feeding the electrolyte. This flows along the feeding channel 304 and reaches the cavity defined by the diaphragm or membrane surface 301, (constituting the bottom of the cavity) and by the thickness of the frame 302. The electrolysis products are removed from the same cavity through the discharging channel 307 and the hole 310. As in the case of the bipolar element EB of FIG. 2, the holes and the channels are entirely incorporated in the body of the polymer material constituting the frame 302. The holes 303 and 308 are surrounded by the gaskets 311 and 312.

The shape of the frames of the bipolar elements 202 and of the separating elements 302 must be congruent, to allow fitting of said elements. For instance, the cellular structure obtainable by coupling alternatively bipolar and separating elements is illustrated by the order described in FIGS. 4 and 4A where, as a demonstration of the principle, four bipolar elements are shown. Item 401 is alternatively fitted with five separating elements, here indicated as 403, kept in position by two terminal covers 404 and 405 by the action of tie rods or similar devices 406 passing through holes 407 of the covers.

Figure 1A:
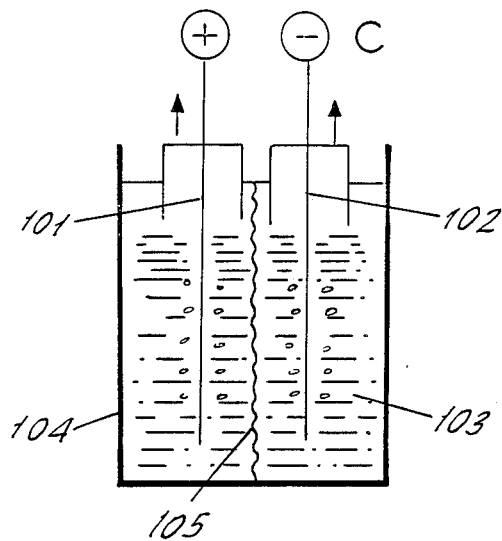
FIGS. 1A and 1B are illustrations of the prior art.
Figure 1B:
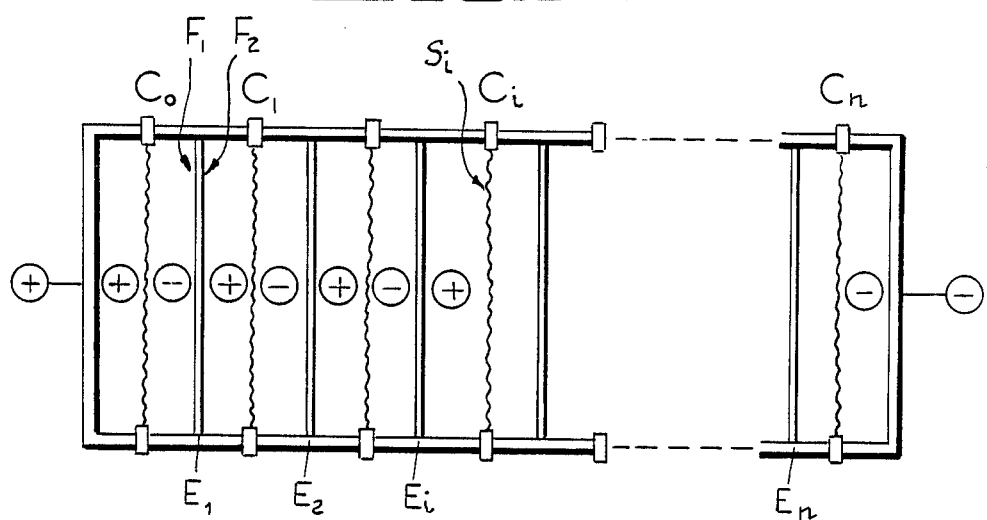
Figure 4A:
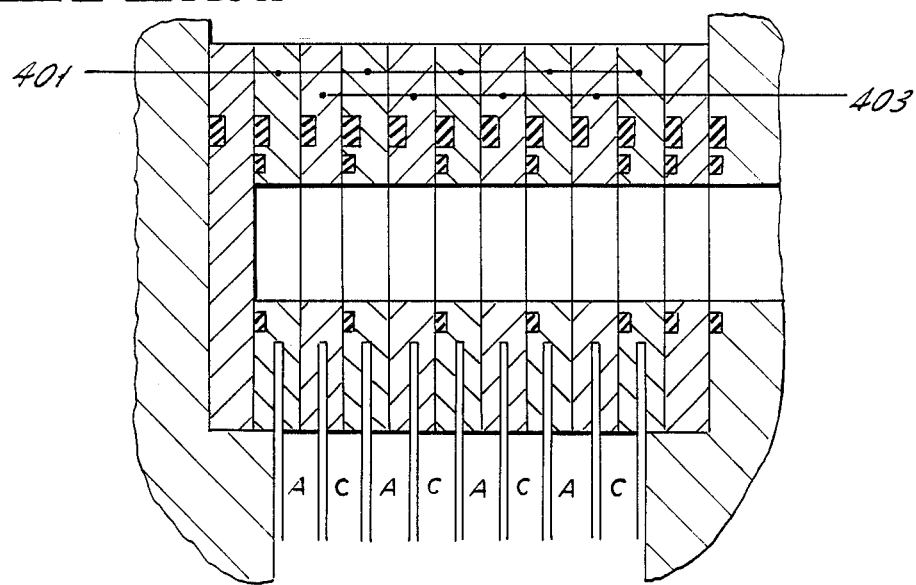
Figure 4B:
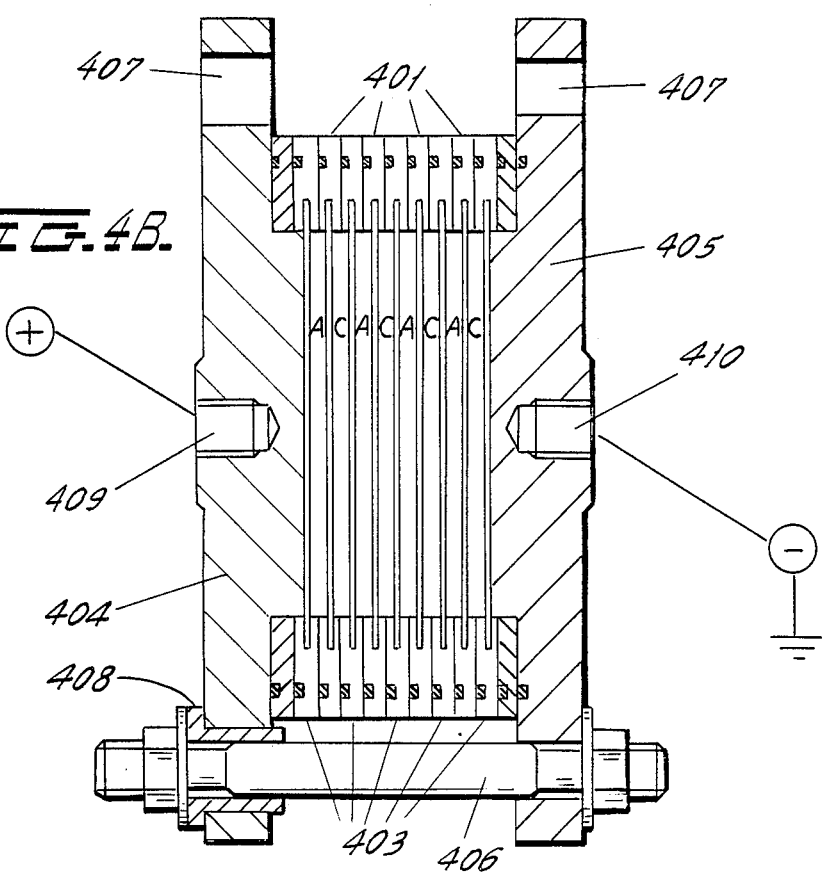

In direct comparison with FIG. 1B, the apparatus of FIG. 4 and FIG. 4A, according to this invention, has the configuration of a bipolar electrolyzer with cells holding a separator. In the practical realization of FIG. 4 the tie rods 406 must be electrically insulated with respect to one of the two covers if these are metallic. This may be obtained by means of an insulating lining or, as shown in FIG. 4, by inserting insulating bushes 408 between cover and tie rods. In such a case the DC feeding connectors are put in contact with the terminal covers using, for instance, screws introduced in holes 409 and 410. This way a voltage is applied to the covers, having a value proportional to the number of bipolar 401 and separating 403 elements existing between them. The electrical insulation of the tie rods prevents short circuiting between the terminal covers.

In a preferred form of the invention the tie rods 406 are electrically insulated with respect to the cover 404 which is connected to the positive pole of the DC generator. This cover, as a result, is polarized anodically, i.e. takes away electrons from the electrolysis system. The cover 405, on the contrary, is polarized negatively or cathodically and is the electron supplier to the system. This cover should be grounded so that it assumes the corresponding ground potential.

The peripheral impermeability to liquids and gases present in the cells because of the electrochemical process can be obtained by inserting gaskets between the alternate elements 401 and 403 and between the terminal elements and the covers 404 and 405. This impermeability is guaranteed by circumferential elements in the form of an O-ring 411, situated in appropriate seats.

With reference to FIG. 4, the cover 404 is anodically polarized and the space between this cover and the first separator 403 constitutes an electrolysis anodic half-cell. This is identified in FIG. 4 by the letter A. The next half-cell, contained between the separator 403 and the bipolar plate 402 and identified by C is cathodically polarized. The sum of these two half-cells constitutes the first electrolysis cell of the electrolyzer. The repetition of alternate half-cells, as in FIG. 4, makes up the bipolar configuration already shown in FIG. 1B, up to the point where an end cathodic half-cell C is in contact with the cover 405, cathodically polarized.

As to fluid distribution inside the electrolyzer, the alternation of bipolar elements 401 with separating elements 403 and the congruence of their geometry create, in the assembly of their frames (202, 203), a system of headers. In particular, the electrolyte is fed to the half-cells C by the header obtained by the alignment of the holes as 203 in FIG. 2 to the holes as 303 in FIG. 3. The electrolyte is fed to the A half-cells by the header obtained by the alignment of the holes as 209 in FIG. 2 and as 309 in FIG. 3. The electrolyte is then fed to the electrolyzer E by means of two nozzles or holes made in a terminal cover, the cathodic cover 405 in the preferred version of the invention. Similarly, the electrolysis products are removed from the half-cells A by the header comprising the alignment of the holes 310 in FIG. 3 to the holes as 210 in FIG. 2, and from the half-cells C by the header obtained by the alignment of the holes as 208 in FIG. 2 to the holes as 308 in FIG. 3. The products are then extracted from E by means of two separate nozzles or holes made in a terminal cover, preferably the cathodic one. Thus, the electrolyzer consisting of many cells has a header for the distribution of the electrolyte to the half-cells polarized with the same sign, a header feeding the electrolyte to the half-cells polarized with the opposite sign, and two headers designed to separately remove the products coming from half-cells of equivalent polarization. These four headers end in four nozzles or holes located on one of the terminal covers, preferably the cathodically polarized cover and, as explained above, preferably grounded.

In an alternative configuration, the electrolyzer may be assembled by coupling a certain number of bipolar elements, obtaining a series of bipolar cells without a separator. Such a configuration is useful for carrying out some conventional electrochemical processes, examples of which will be given later. In this very case only one header for the electrolyte inlet will be formed inside the frames, due to the alignment of holes as 208 in FIG. 2.

The great flexibility of such cell system in terms of possibilities of arrangement is further demonstrated by the opportunity for assembling electrolyzers consisting of bipolar cells having more than a single separator, even if each of them has a different nature, as useful in very special processes. In this case, the frames need a larger number of holes and feeding-discharging channels than in the examples of FIGS. 2 and 3.

Regarding the bipolar electrolyzer with or without a separator, it has been stated that the bipolar plate 201 in FIG. 2 may constitute the only electrically conductive item of the bipolar elements. In fact, both the particular method selected for the distribution and collection of the fluids involved in the electrochemical process and the particular configuration of the bipolar and separating elements allow cells to be assembled with a largely reduced electrodic gap. The bipolar plates may be constructed depending on the electrochemical process to be performed, by materials suited to the particular case and can be further submitted to any surface treatment, in accordance with known techniques, in order to ensure electrocatalytic activity.

Better results can be obtained by utilizing critical electrodic structures in accordance with the invention.

FIG. 4 shows how the series coupling of bipolar elements 401 with separating elements 403 leaves (inside the electrolyzer) spaces to be filled up by the electrolyte, spaces which are indicated above as constituting anodic (A) and cathodic (C) half-cells. The electrodic structures as per the invention have a configuration capable of filling up completely the spaces or half-cells. Each structure is, in practice, a tri-dimensional electrode conceptually differing from conventional electrodes which utilize two space dimensional electrodes. On the left of FIG. 5, two bipolar elements 501 are coupled maintaining the separating element 502 in the correct position. Two electrodic structures 503 are inserted between the bipolar plates 504 and the separator 505. The electrode structures 503 fill the consecutive half-cells constituting a single electrolysis cell. On the right of FIG. 5 is shown an "exploded view" of two analogous electrodic structures 506, a separating element 507 and a bipolar element 508, in order to show separately the various parts constituting the single electrolysis cell.

Figure 6A:
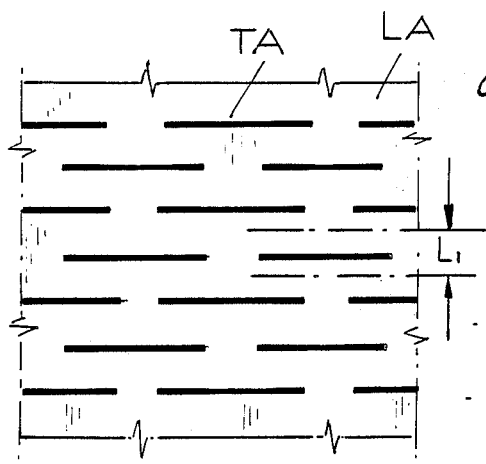
FIGS. 6A and 6B are front views.
Figure 6B:
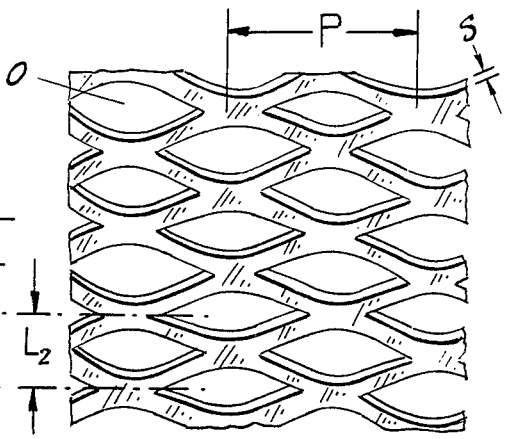

The electrodic structures conduct electrical current from the bipolar plates to the separators, allowing the electrolysis products, generated in the body of the structures, to leave the generation sites, and allowing the electrolyte to have access to said sites. Electrical continuity between each bipolar plate and the parent electrodic structure is required and can be obtained by coupling them by screws or weldings. Alternatively, the electrodic structure and the bipolar plate are attached by pressure. The electrodic structures are geometric solids having high internal porosity, obtained from metallic or electrically conductive materials having a large surface area per unit volume. For example, wire in the form of fabrics or knit-mesh, strips or nets, thin sheets processed in different ways, and granules or other particular material. In a preferred form of the invention, the electrodic structure is made of a thin expanded sheet maintained in contact with the separator by several layers of thin wire in the form of knit mesh. The electrodic structure fills up the entire volume available between the separator and the bipolar plate. In order to give better details, the term "expanded sheet" refers to the product obtained by the process illustrated in FIG. 6. A metal sheet LA is cut with cuts TA at full thickness in a pattern illustrated in FIG. 6A and then submitted to elongation perpendicular to the cuts, to induce a deformation due to the stretching to a final eyelets O configuration similar to the one shown as example in FIG. 6B. P is the cross pitch of the cuts, S the sheet thickness, and $AL = (L_2 - L_1) \, 100/L_1$, the percentage elongation of the sheet due to the stretching.

Figure 6C:
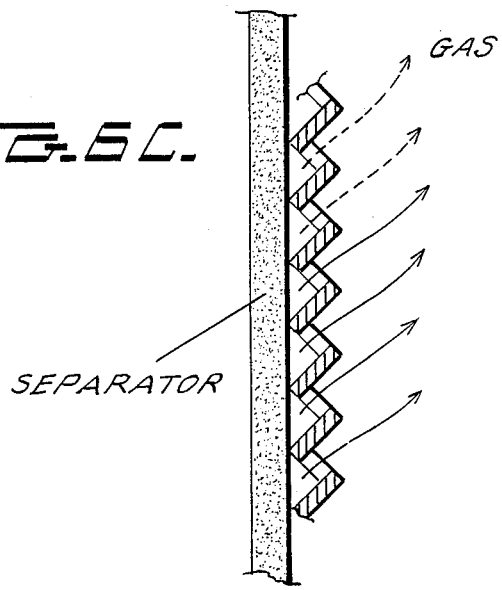
FIG. 6C is a cross section, of electrodic structures.

When installing the expanded sheets in the cells, care must be taken to lay the cuts horizontally, in such a way that the orientation of the holes O facilitates removal of the gases from the separator, as shown in the cross section of FIG. 6C. The arrows indicate the direction of the gas flow through the holes O.

In an alternative construction, the electrodic structure is a compound of thin expanded sheets, sandwiched with thin wire mesh. In a further form, the structure has been obtained by pressing bulk wires to give the mass the shape corresponding to the half-cell to be filled up.

If electrocatalytic characteristics are desired, the electrodic structures are submitted to conventional treatments for the activation of their surface.

The electrodic structures in the electrolyzers as in the invention permit the use of high current densities without loss of voltage or energy efficiency of the electrolysis system.

Every electrolyzer, when constructed in accordance with the directions of this invention, is particularly useful for operating at super-atmospheric pressure. Thus, electrolysis can be obtained in a wide temperature range, including temperatures above the atmospheric boiling point of many aqueous electrolytes. Operation under pressure, by reducing the specific volume of the gaseous products, allows use of cells of minimal thickness, smaller than the current state of the art. It is also possible to obtain gaseous products already compressed, which is very useful for many applications. Also, the cross section of the electrolyte feeding and product discharge channels are minimized. Thus, the dispersed electric current is negligible, because the channels have non-conductive walls and may have a relatively long path. In this way, a current efficiency is obtained which is very close to 100% in case of absence of secondary electrochemical reactions, as in the case, for instance, in water electrolysis.

Regarding the construction materials for the various components of the electrolyzer in this invention, Table I is a list of polymeric materials usable for molding the frames of the bipolar and of the separating elements, with reference to some typical industrial processes. The polymeric materials listed can be reinforced with chemically inert substances, for example asbestos fibers, glass fibers or powder, mineral fillers, in order to make them mechanically more resistant.

TABLE I

| Polymeric materials for frame molding | Electrolysis process | | |
|---|---|---|---|
| | water electrolysis | | sodium chloride electrolysis in aqueous solution |
| | alkaline | acid | |
| acetalic copolymers | yes | | |
| acrylic polymers | | | yes |
| ABS | yes | yes | yes |
| epoxy resins | yes | | yes |
| nylons 11 and 12 | yes | | |
| polyester resins | | yes | |
| poly (4-methyl pentene-1) | yes | yes | yes |
| polypropylene | yes | yes | yes |
| polyphenilene oxide (PPO) | yes | yes | yes |
| polysulfones | yes | yes | yes |
| PTFE | yes | yes | yes |
| polythene | yes | yes | yes |
| PVC | yes | yes | yes |
| acrylonitrile-styrene (SAN) | yes | | |
| chlorinated polyether | yes | | |
| furanic resins | yes | yes | yes |
| ebanite | yes | yes | yes |
| polyphenylene sulphide (PPS) | yes | yes | yes |
| polyvinylidene fluoride (PVDF) | | yes | |

The electrically conductive items, e.g. the covers, the bipolar plates and the electrodic structures, must withstand the attack of the fluids present inside the electrolyzer in polarization conditions. The A-type half-cells in FIG. 4 must be made of materials which we briefly indicate as "anodic", the C-type half-cells of materials which we indicate as "cathodic". One of the big advantages of the electrolyzer in this invention is its surprising design simplicity, which makes it feasible with a large number of conductive materials even if they are not machined easily. Table III is a list of materials usable in typical electrolytic processes.

TABLE II

| Conductive materials | Electrolysis process | | |
|---|---|---|---|
| | water electrolysis | | sodium chloride electrolysis in aqueous solution |
| | alkaline | acid | |
| (A) Anodic materials: | | | |
| nickel alloys | yes | | |
| pure nickel | yes | | |
| nickel plated carbon steel | yes | | |
| silicon iron | | yes | |
| Fe-Cr-Ni-Mo alloys | | yes | |
| graphite | | yes | yes |
| graphite reinforced resins | | yes | |
| amorphous carbon | | yes | |
| titanium | | | yes |
| (C) Cathodic materials: | | | |
| carbon steel | yes | | yes |
| stainless steel | yes | | yes |
| nickel plated carbon steel | yes | | yes |
| nickel alloys | yes | | yes |
| pure nickel | yes | | yes |
| zirconium | | yes | |
| tantalum | | yes | |
| silicon iron | | yes | |
| Fe-Cr-Ni-Mo alloys | | yes | |
| graphite | | yes | |

The terminal covers may be constructed of carbon steel, lined with cathodic or anodic material only in the part in contact with the electrolyte. The bipolar plates, in turn, may be constructed of a single material, when this can withstand both anodic and cathodic conditions. In other cases, they may be lined or plated material in order to satisfy both conditions.

The separators are conventional. For example, asbestos paper, board, felt or fabrics, PVC fabrics, and ionically active membranes. In this manner the electrolyzer can accept as a separator, ionically active membranes covered on both sides by electrocatalytic materials.

Figure 7:
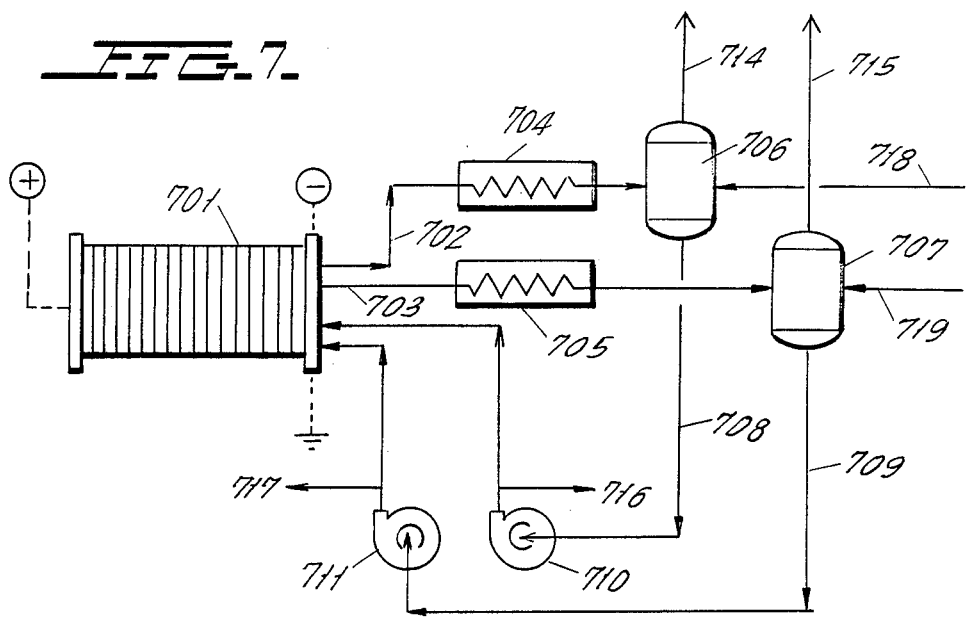
FIGS. 7 and 8 are process flow sheets.

The invention is completed with a system of auxiliary equipment. As is shown in FIG. 7, the electrolyzer 701 is fed with direct current, to ground the cathodic terminal cover. In this way, all the equipment and metal piping electrically connected with said cover is equipotential and grounded. The lines 702 and 703, provided to extract the electrolysis products coming from the anodic and respectively cathodic half-cells, feed the same products to the respective coolers 704 and 705; their purpose is to maintain (at the desired temperature) the electrolyte circulating in the system. The electrolysis products then reach the vessels 706 and 707, where the gaseous products are separated from the electrolytes which in turn, using the lines 708 and 709, are fed to the suction pumps 710 and 711.

The pumps send back the electrolytes to the electrolyzer. The gaseous electrolysis products leave the system by means of the lines 714 and 715, and the liquid products through the lines 7 and 717. The feedstock solutions for the electrolysis process are fed to the system through the nozzles 718 and 719.

Control and measurement devices can be installed as required.

The following examples (not exhaustive) regard practical applications of this invention.

EXAMPLES

Example 1

An electrolyzer made of 20 diaphragm cells was assembled by using 20 separating elements and 19 bipolar elements, put alternatively in series and held between two terminal stainless steel covers. The electrolyzer configuration corresponded then to the illustration in FIG. 4. The separators were asbestos fabrics of 2 mm thickness. The bipolar plates were pure nickel of 0.2 mm thickness. The frames were made of injection molded polypropylene, with asbestos reinforcing fibers. The anodic cover was nickel-plated on the surface in contact with the electrolyte for a 20 micron thickness. The electrodic structures, having a cross section of 80 cm$^2$, were 3 mm thick, obtained by packing a pure nickel sheet with S=0.2 mm, expanded with pitch P=2 mm and elongation A=60%, with 4 layers of nickel knit mesh, wire diameter 0.06 mm. The assembling of the structures was such that the expanded sheet was in contact with the asbestos diaphragm and electrical continuity between bipolar plates and electrodic structures was guaranteed by the pressure exerted between each other. The electrodic structures were not electrocatalytically activated.

The electrolyzer was used to perform water electrolysis, and was installed in a plant system similar to the general flow diagram of FIG. 7, but simplified for this particular case where a single electrolyte is circulated. Thus there was only one circulation pump.

The electrolyte was an aqueous solution of KOH at 25% strength.

The cells were tested at various temperatures and at 0.5 bar pressure. Below, in Table III, are measurements at 40°, 60°, 80° C:

TABLE III

| Temperature (°C.) | Current (A) | Current density (A/cm$^2$) | D.C. voltage (V) | Cell voltage (V) |
| --- | --- | --- | --- | --- |
| 40 | 16 | 0.20 | 39.0 | 1.95 |
|  | 24 | 0.30 | 42.2 | 2.11 |
|  | 32 | 0.40 | 43.8 | 2.19 |
| 60 | 20 | 0.25 | 38.4 | 1.92 |
|  | 25 | 0.32 | 40.0 | 2.00 |
|  | 30 | 0.38 | 48.0 | 2.40 |
| 80 | 12 | 0.15 | 33.8 | 1.69 |
|  | 20 | 0.25 | 36.0 | 1.80 |
|  | 24 | 0.30 | 37.0 | 1.85 |
|  | 32 | 0.40 | 38.4 | 1.92 |

The cell efficiency, calculated as the ratio between the thermodynamic reversible voltage (1.48 V) and the above cell voltage at 80° C. is in the range of 77% (at 0.4 A/cm$^2$) to 87.5% (at 0.15 A/cm$^2$). The technical literature shows that, in the same conditions, the efficiency of commercial (non activated) cells is of the order of 62 to 72%.

Example 2

An electrolyzer comprising 125 cells, set up by alternating elements with 124 bipolar elements was prepared to produce hydrogen and oxygen by water electrolysis. The bipolar elements were 328 mm in outside diameter and were constructed using nickel-plated carbon steel discs, 1 mm thick, surrounded by a frame 24 mm wide and 7 mm thick. The frame was prepared by injection molding of polyphenyleneoxide (PPO) with holes of 12 mm diameter either for electrolyte feeding or the discharge of the electrolyzer products.

The separating elements were 2 mm thick asbestos board, surrounded by frames of the same material and diameter as the bipolar elements. The separating elements are 4 mm smaller than the bipolar elements. The electrolyte feeding channels and the electrolyzer product discharge channels had a rectangular cross section of 3 by 1.5 mm and 200 mm in length each.

Every electrolyzer half-cell contained an electrodic structure of 600 cm$^2$ circular section, assembled by packing alternately sheets 0.3 mm thick, expanded to obtain a 2.5 mm pitch and 60% elongation, with metal wire knit mesh. Every electrodic structure comprised three expanded sheets alternating with double layers of knit mesh. Expanded sheets and knit mesh was pure nickel for the anodic half-cells, and nickel-plated carbon steel for the cathodic ones. Before the assembling of the electrolyzer, the structures were submitted to activation, conventionally by galvanic deposition of nickel sulphide from a thiosulphate bath onto the nickel-plated carbon steel structure and superficial anodic attack of the anodic nickel structure, in the same bath.

The electrolyzer is assembled by inserting all the elements necessary for the 125 bipolar cells between two terminal covers of nickel-plated carbon steel, connected to each other by 8 tie rods of 12 mm diameter, electrically insulated with respect to the anodically polarized cover. The cover connected with the cathodic termination was grounded.

The electrolyzer was provided with nozzles for the electrolyte feeding to the anodic and cathodic half-cells and for the discharge of the electrolyzer products from the half-cells having the same polarization sign. The electrolyte was an aqueous solution of potassium hydroxide of 26% strength b.w.

Figure 8:
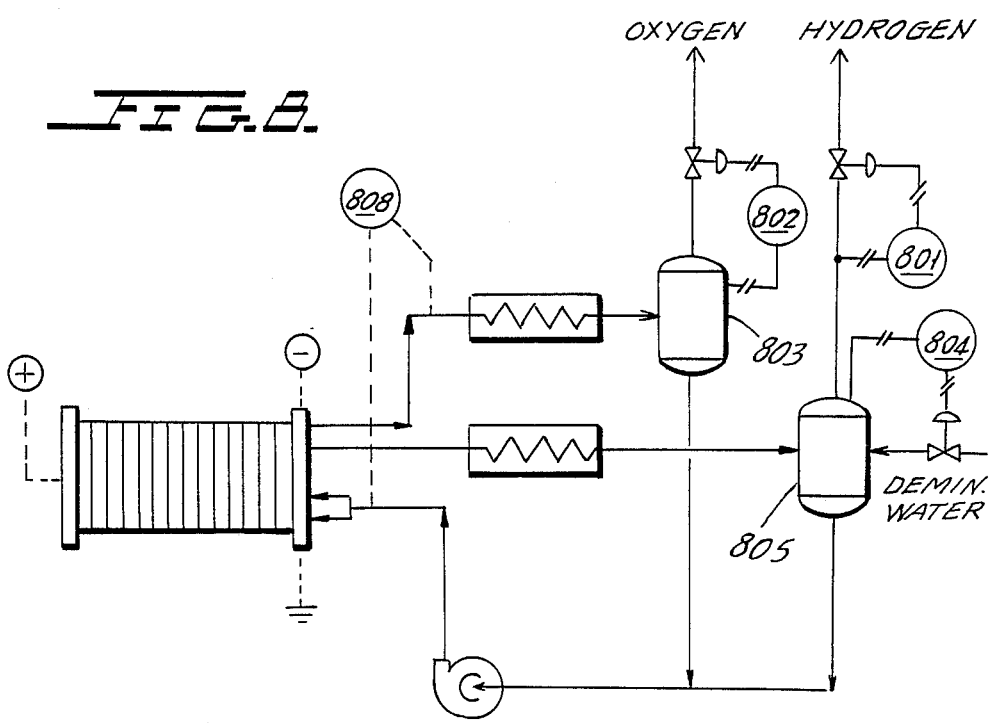

The plant system used to operate the electrolyzer is shown in FIG. 8, where the main control instruments are also schematically indicated, e.g. the pressure controller 801, maintaining the internal pressure of the system at 5 bar by acting on the hydrogen stream; the level controller 802 of the liquid in the vessel 803, acting on the oxygen stream; the liquid level controller 804 for the vessel 805, acting on the demineralized water feed; the recorder 808 of the inlet and outlet temperature of the electrolyte from the cell system.

After starting the electrolyte circulation and gradually raising the D.C. flow up to 100 A, the electrolyte heating was continued, while the system operation parameters were stabilizing, i.e. pressure and liquid levels. At a temperature of 70° C., measured in the electrolyzer products, the D.C. voltage is 204 V.

After increasing the D.C. flow up to 125 A, the temperature was raised to 80° C. This temperature was maintained by electrolyte cooling, further increasing step by step the D.C. flow and taking note of the following running data:

| D.C. current | 125 A | D.C. voltage | 203 V |
| --- | --- | --- | --- |
|  | 180 A |  | 210 V |
|  | 250 A |  | 218 V |
|  | 300 A |  | 223 V |

Taking into account the cross section of the electrodic structure in the calculation of the current density, the following values are obtained:

| Current density (A/m$^2$) | Cell voltage (V) | Voltage efficiency (ref. 1.48 V) (%) |
| --- | --- | --- |
| 2080 | 1.62 | 91 |
| 3000 | 1.68 | 88 |
| 4160 | 1.74 | 85 |

-continued

| Current density (A/m$^2$) | Cell voltage (V) | Voltage efficiency (ref. 1.48 V) (%) |
|---|---|---|
| 5000 | 1.78 | 83 |

The above values give efficiencies higher than the ones found with commercial state of the art cells.

The total length of the 125 cell electrolyzers was 1580 mm, including the terminal covers.

Example 3

The current dispersion through the fluid feed and discharge pipes is minimized, as shown in the following example.

An electrolyzer designed to perform the same electrolysis process as in the preceding examples was assembled using 63 cells of the configuration already described. The diameter of the electrodic structures was, in this case, 800 mm. The electrolyte feeding and discharge channels had a cross section of 28.2 mm and a length of 560 mm each, being totally contained in the frames of the bipolar and separating elements.

An electrolyte feeding channel of these dimensions, having non-conductive walls, corresponds to a resistor of 220 Ohm at an operating temperature of 40° C. An electrolyzer discharge channel, assuming the total absence of gaseous phase (which is an extremely conservative position) corresponds in turn to a resistor of 120 Ohm at 90° C. Neglecting electrical resistance of the fluids headers and with each cell having two feeding and two discharging channels, it can be calculated that the maximum amount of the dispersed current is $$I_d = 2 V_c (1/220 + 1/120) \frac{n(n+1)}{2}$$

where $V_c$ is the average cell voltage and n the total number of cells constituting the electrolyzer.

In this example, by feeding the electrolyzer with a D.C. of 2000 A, the total voltage amounted to 111 V, corresponding to an average cell voltage of 1.76 V.

From the preceding equation $I_d = 91.5$ A is obtained.

The total D.C. used in the electrochemical process is 2000 (63) = 126,000 A, the minimum current efficiency of the system is calculated as 99.93%.

Example 4

An electrolyzer identical to the one described in Example 2 was designed for an operating pressure of 30 bar. Thus, the frames of the bipolar and separating elements were molded making use of polyphenylene sulphide (PPS), a polymer having a high mechanical resistance characteristics and capable of withstanding the fluid phases in electrolysis conditions. The apparatus was operated at 90° C., in conditions equivalent to what was described in Example 2.

A demonstration run was performed for an extended period, with a constant D.C. of 240 A applied to the electrolyzer, i.e. a current density of 4000 A/m$^2$. At operating conditions, the voltage across the electrolyzer was 210 V, equivalent to an average cell voltage of 1.68 V, not taking into account the eventual voltage drops of the external circuit. This means a voltage efficiency of 88%. Applying the formula given in Example 3 to the configuration of the present cells, the current efficiency is calculated to be higher than 99.6%. The energy efficiency of the electrolyzer, in the selected operating conditions, is higher than 87.6%, with a specific consumption of 4.04 kWhr/Nm$^3$ of produced hydrogen.

Example 5

Of the chemical compounds having oxidizing properties, chlorine is the most widely used in water treatment operations. The compounds utilized are generally calcium and sodium hypochlorites and gaseous chlorine.

A very important alternative is the direct production of active chlorine in a sodium chloride solution, to be added to the water to be sterilized. When the water is sea water, as in the large cooling plants of many power stations, the active chlorine production takes place by submitting the sea water itself to electrolysis.

From the point of view of the electrochemical process, this means converting part of the sodium chloride content of the sea water into hypochlorite by means of the chloride electrolyzer in cells without a separator. The aim is the production of water having an active chlorine content of the order of a few grams per liter. The solutions obtained are further diluted in the main sea water stream down to final concentrations of the order of 1 to 2 mg/l.

A surprisingly simple and convenient way to set up an electrolyzer for this process consists in assembling a certain number of bipolar elements having the configuration as described above and sketched in FIG. 2, having bipolar plates in titanium.

The resulting electrolyzer is shown in FIG. 9. The heads, or terminal covers must also be titanium or titanium-lined. Polarizing anodically the cover at the extreme left of the figure, the internal surface of the same head was anodic. The bipolar plates get cathodic (−) polarization on their surfaces facing the anodic cover and anodic (+) on the opposite faces. It is useful for the anodic surfaces to be coated with a catalyst capable of selectively promoting the desired anodic reaction of chlorine generation. Conventionally, titanium and ruthenium mixed oxides are used.

On the cathodic surfaces the water electrolyzer takes place with development of gaseous hydrogen, this gas leaving the system with the liquid electrolyzer products, and formation of hydroxyl ions. This is reacted with the chlorine evolved along the anodic surfaces, thereby producing the hypochlorite.

An electrolyzer was assembled coupling 50 bipolar elements having titanium plates as described above, and PVC frames. The terminal covers were carbon steel titanium-lined.

The net surface of each plate amounted to 0.06 m$^2$ and the anodic face of each plate was coated with titanium and ruthenium mixed oxides, deposited by thermal decomposition in the presence of air, of a solution of their salts. The same activation treatment had been used for the lining of the anodic cover.

The cathodic cover was grounded and provided with nozzles for the introduction of sea water and for the extraction of the electrolyzer products.

Sea water flow of 2100 liters per hour was fed to the above electrolyzer. The water was discharged having an active chlorine content of about 2 grams/liter. The voltage between the two terminal covers was 250 V, resulting in a D.C. flow across the electrolyzer, of 75 A.

I claim:

1. An apparatus for the electrolysis of solutions, comprising a sequence of at least two bipolar elements stacked together between two terminal covers, each of said bipolar elements comprising:
- a plate of conductive material fitted along its periphery in a frame of electrically insulating material thicker than said plate so as to form, at both sides of said plate, cavities for holding electrolyte, said cavities being bounded by said conductive plate and by said frame;
- an electrolyte feed channel comprising a first groove extending over a sector of said frame, said electrolyte feed channel having an inlet port for receiving electrolyte through a feed aperture in said frame, and an outlet port for discharging electrolyte into said cavity through a discharge aperture in said frame;
- an electrolysis products outlet channel comprising a second groove extending over another sector of said frame, said electrolysis products outlet channel having an inlet port for receiving electrolysis product from said cavity through a feed aperture in said frame, and an outlet port for discharging said electrolysis product through a discharge aperture in said frame;
- a peripheral gasket in the form of a ring disposed in an annular seat in said frame so as to make a pressure-tight joint between adjacent frames when said frames are stacked against one another;
- additional apertures in said frame for allowing said electrolyte and said electrolysis product to bypass certain of said cavities as it passes through the electrolyser;
- gaskets located in seats surrounding said additional apertures for minimizing electrolyte and electrolysis leakage from said additional apertures.

2. An apparatus according to claim 1, further comprising separator elements disposed between pairs of adjacent bipolar elements, each of said separator elements comprising:
- a porous diaphragm fitted along its periphery in a separator frame of electrically insulating material thicker than said plate so as to form, at both sides of said plate, cavities for holding electrolyte, said cavities being bounded by said porous diaphragm and by said separator frame;
- an electrolyte feed channel comprising a first groove extending over a sector of said separator frame, said electrolyte feed channel having an inlet port for receiving electrolyte through a feed aperture in said separator frame, and an outlet port for discharging electrolyte into said cavity through a discharge aperture in said separator frame;
- an electrolysis products outlet channel comprising a second groove extending over another sector of said separator frame, said electrolysis products outlet channel having an inlet port for receiving electrolysis product from said cavity through a feed aperture in said separator frame, and an outlet port for discharging said electrolysis product through a discharge aperture in said separator frame;
- a peripheral gasket in the form of a ring disposed in an annular seat in said separator frame so as to make a pressure-tight joint between said separator frame and the adjacent bipolar element frame;
- additional apertures in said separator frame for allowing said electrolyte and said electrolysis product to bypass certain of said cavities as it passes through the electrolyser;
- gaskets located in seats surrounding said additional apertures for minimizing electrolyte and electrolysis leakage from said additional apertures.

3. An apparatus according to claim 2, wherein said sequence of bipolar elements defines a plurality of cells between said terminal covers, each of said cells comprises an anodic and cathodic half cell, and wherein internal headers for the distribution of electrolyte to said half-cells are formed by the alignment of said feed apertures of said bipolar elements with said additional apertures of said separator elements, and internal headers for the extraction of electrolyte from said half-cells are formed by the alignment of said feed apertures of said separator elements with said additional apertures of said bipolar elements.

4. An apparatus according to claim 3, further comprising three-dimensional electrodic structures disposed between said bipolar elements and said separator elements, said electrodic structures having electrical continuity with said bipolar elements, high internal porosity, and high surface-per-unit of bulk volume.

5. An apparatus according to claim 4, wherein each cell comprises two bipolar elements, one separator element and an electrodic structure between each bipolar plate and separator;
- said electrodic structure being made from a thin, cut and expanded metal sheet, preferably maintained in contact with the separator by a number of layers of metal knit mesh, said electrodic structure filling up the entire volume existing between said separator and said bipolar plates.

6. An apparatus according to claim 5, wherein the metal sheet is horizontally cut and expanded in such a way to form holes for improving the removal of any gaseous phase from said separator element.

7. An apparatus according to claim 2, wherein said bipolar elements and said separator elements are stacked alternately in said electrolyzer, said bipolar element frames and said separator frames being positioned so that the corresponding apertures, grooves and seats of the frames are aligned with each other.

8. An apparatus according to claim 2, further comprising:
- insulated tie rods for maintaining said bipolar and separating elements in position, said insulated tie rods extending between said terminal covers and passing externally to said sequence of bipolar and separator elements, said terminal covers being connected to the poles of a D.C. source; and
- gaskets separating the terminal covers and the bipolar elements at each end of the electrolyser.

* * * * *